Aug. 4, 1953      G. P. BENTLEY ET AL      2,647,437
PICTURE UNIT FOR STEREOPTICONS
Filed May 17, 1949      2 Sheets-Sheet 1
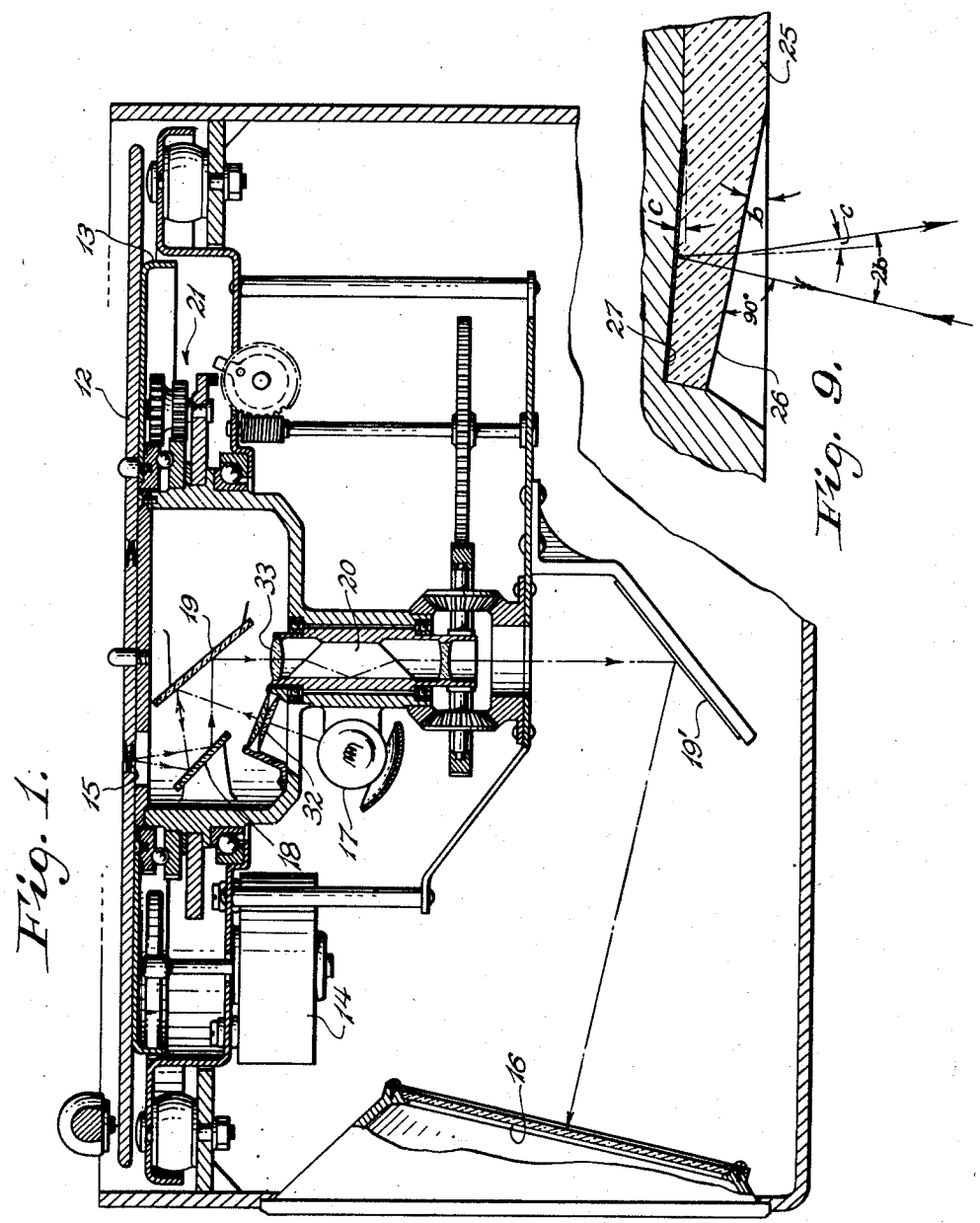
INVENTORS
GEORGE P. BENTLEY AND
FRANK R. HOUSE
BY
THEIR ATTORNEY Aug. 4, 1953
G. P. BENTLEY ET AL
2,647,437
PICTURE UNIT FOR STEREOPTICONS
Filed May 17, 1949
2 Sheets-Sheet 2
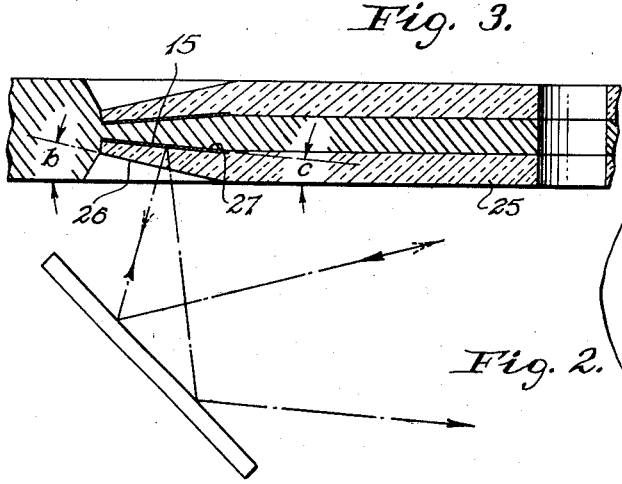
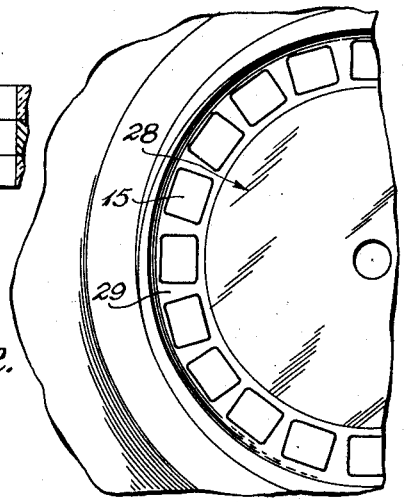
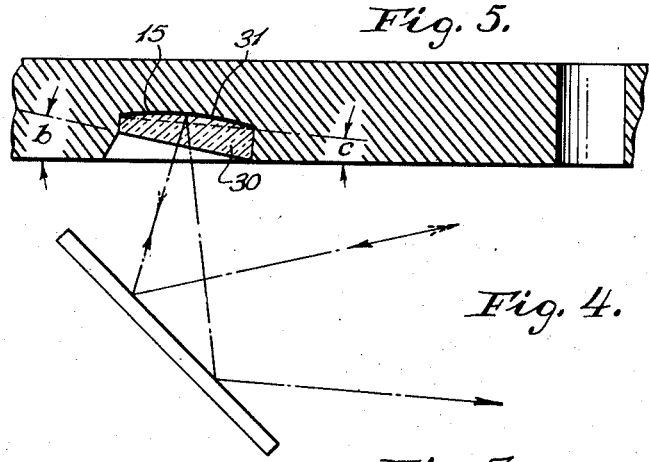
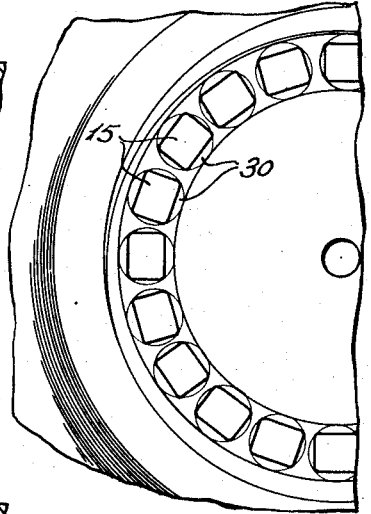
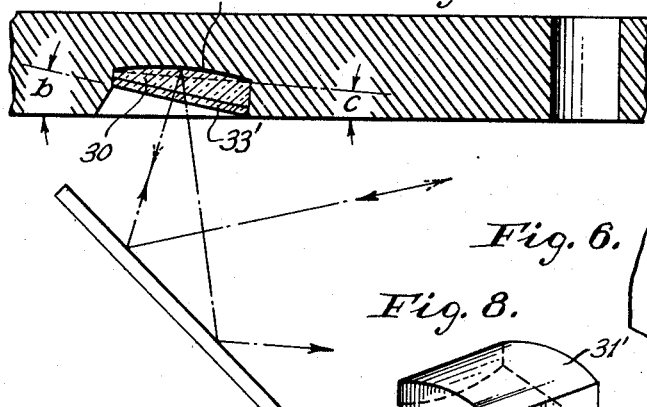
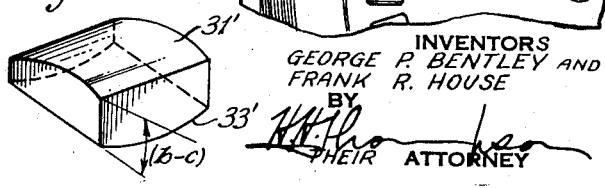
INVENTORS
GEORGE P. BENTLEY AND
FRANK R. HOUSE
BY
THEIR ATTORNEY Patented Aug. 4, 1953

2,647,437

UNITED STATES PATENT OFFICE 2,647,437

PICTURE UNIT FOR STEREOPTICONS

George P. Bentley, Garden City, and Frank R. House, Baldwin, N. Y., assignors to Instrument Development Laboratories, Inc., Williston Park, N. Y., a corporation of New York Application May 17, 1949, Serial No. 93,664

9 Claims. (Cl. 88—27)

This invention relates to the projection of pictures by reflection rather than by passing a beam through a transparent film to the projection screen. Although we prefer to obtain the projected image by reflection, yet as the picture source, we prefer to use ordinary transparent film such as used for 8 or 16 mm. motion pictures, either colored or black and white, but we coat the back of the film with reflective coating to provide a highly reflective surface. Such pictures are well adapted for use on phonograph records, as described in our prior application for Letters Patent for a Stereopticon Phonograph, now Patent No. 2,587,433, dated February 26, 1952, but their use is not limited to this field.

More particularly, by our present invention, we improve the image projection obtained on the screen by eliminating a source of glare found to affect picture projection when the ordinary picture film is used in the matter above indicated. Unfortunately, all films have a more or less glossy front surface; thus, about 5% of the incident light from the source is specularly reflected from the front surface of the film, and at an angle into the projection system. This reflection is a uniform white over the entire film, and acts as a glare which prevents satisfactory projection of the image on the film.

To overcome this, we either use a special film or preferably place a transparent coating on each picture on the film or over the center of the record around which the pictures are placed, which film or coating has its front surface non-parallel with, i. e., at a small angle to its rear surface, the angle being such that the specular component of reflection from the front surface is reflected back to the light source and not to the projector, so that the glare is eliminated. Preferably, because of the refraction of the reflected rays on leaving the coating, we may also incline the film itself at a slight angle to the plane of the record, so that the reflected rays will exit in the same direction as they would if our special coating was not used.

We also have found that the brightness and clarity of the picture, especially at the periphery thereof, may be further improved by making the rear surface of the transparent coating over the film slightly convex and so designed that the condenser lens is imaged on the projector lens by the concave mirror formed thereby. By this means the uniformity of illumination across the field is increased as well as the brilliance of the image. This result can be obtained by making both the front and back surfaces cylindrically convex, but about axes of curvature normal to one another.

Referring to the drawings showing several forms of our invention,

Fig. 1 is a sectional view partially in elevation of a stereopticon phonograph machine on which the special pictorial record of our invention is adapted to be used and shown;

Fig. 2 is a plan view partly broken away of a record showing a series of our improved pictures around the inner portion thereof;

Fig. 3 is a transverse section of the center portion of the record through one of the pictures;

Fig. 4 is a view similar to Fig. 2 showing a modified form of transparent coating for each individual picture;

Fig. 5 is a transverse section of a portion of the same;

Fig. 6 is a broken away plan view of still another form of our invention;

Fig. 7 is a section of the same showing both the front and back surfaces of the coating curved;

Fig. 8 is a detail, on a magnified scale, of one of the optical coatings for each picture of the form showing in Figs. 6 and 7; and Fig. 9 is an enlarged sectional detail showing the path of the incident and reflected light rays which illuminate a picture.

In our aforesaid patent application, we described a stereopticon phonograph machine adapted to simultaneously play a record and show pictures on a screen successively related to the record being played. The elements of such a machine are shown in Fig. 1, in which the record proper is shown at 12 mounted on a turntable 13 rotated by a motor 14 in a known manner. The record is provided with a plurality of picture inserts 15 symmetrically arranged about the center on both sides of the record and the pictures are projected on a screen 16 by projecting light rays from lamp 17 on the mirrors 18 and 19, light being reflected from each picture at a slight angle to the incident rays to pass through the rotatable dove prism 20 to mirror 19' and projecting screen 16. Suitable index means 21, as described in the aforesaid application, may be provided to shifted the record through one picture frame for each revolution or plurality of revolutions of the record.

It is noted that with this type of projection, the light rays do not pass through the film as in ordinary stereopticons or in motion pictures, but on the other hand, are reflected from the picture itself. The pictures are preferably small negatives or transparencies and are usually in the form of 8 or 16 mm. film. Preferably, the film has a bright coating on the back thereof to reflect as much light as possible.

With this type of projection, it was found that some clarity was lost by the reflection of rays from the front surface of the glossy film, which rays were therefore reflected before penetrating to the picture itself. This resulted in a background glare which decreased the clarity and brilliance of the picture. To overcome this difficulty, we place a transparent coating 26 over each picture in which the front and back surfaces 26 and 27, respectively, of the coating for each picture are not parallel, but are inclined to each other at a slight angle, as shown in Figs. 3 and 9. In Figs. 2 and 3 this coating is shown as covering the center portion 28 of the record on both sides, and the peripheral edges 29 of these circular discs are bevelled off to form an angle $b$ between the outer edge and main surfaces thereof. The angle $b$ between the plane of the record and the outer surface of the coating is so selected that the specular component of reflection from the front surface is reflected back to the light source and not toward the projector. Stated in a different way, the outer surface of the plastic coating is normal to incident rays, while the rear surface is at an angle $b$ thereto. The rays which penetrate the plastic and strike the film itself therefore are reflected back at an angle approximately $2b$ toward the projector.

However, on account of the fact that the emergent light rays in the plastic are refracted through a small angle $c$, (Fig. 9) we have found it desirable that the back 27 of the plastic coating, in other words, the front surface of the film, be inclined at the angle $c$ to the plane of the record so that the rays will emerge at the angle $2b$, the angle they would have emerged if the plastic coating was not used and the film surface were parallel to the record. In this manner the machine may be used with pictures having our improved coating thereon or not without changing the lens system angles.

The film itself is cemented to the plastic with material of substantially the same refractive index as the plastic and film, thereby eliminating any interface reflections or refractions.

One modification of the invention is shown in Figs. 4 and 5. In this form, each separate frame or picture is cemented to a separate plastic block 30 instead of having a continuous plastic coating on the record. Also, we show in these figures that each block may have a convex rear surface 31 so designed that the condenser lens 32 is imaged by the concave mirror formed thereby on the projector lens 33 (Fig. 1). By this means the uniformity of illumination is improved and increased image brilliance obtained.

Instead of forming a convex surface in both planes, as shown in Figs. 4 and 5, the back surface 31' of the plastic block 30 may be formed cylindrically convex and the front surface 33' cylindrically convex about an axis normal to the axis of the first mentioned surface. This formation is shown in detail in Figs. 6, 7, and 8.

While we have described our invention as especially adapted for the pictorial records for stereopticon phonographs, the optical principles are obviously adapted for projection of any type of negative on film or glass in which reflection from the front surface may decrease the clarity of the picture.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus the thickness of the record and its coatings are shown greatly exaggerated in Figs. 3, 5, 6 and 7 for the sake of clarity, applicants intending to keep the overall thickness about the same as the ordinary record.

What is claimed is:

1. A stereopticon phonograph record having a series of miniature still pictures concentrically arranged around the center of the record, said pictures being transparencies with a reflecting opaque backing, each picture being adapted to be projected successively and having a transparent juxtaposed coating with non-parallel front and back surfaces, the front surface being normal to the illuminating rays and the back surface being convex and at such an angle that the specular image of the picture is reflected onto the screen while the rays reflected from said front surface do not reach the screen.

2. In combination with a sound recording disc, a series of film transparencies cemented to and arranged around the center of the disc axis and illustrative of the sequences of the sound record, a transparent coating superimposed upon said transparencies and adhering to same, and a reflective coating secured to the outer surface of said film, the outer and inner surfaces of the transparent coating not being parallel so that the specular reflective components of incident light as reflected from the front and rear surfaces of the transparent coating are deviated one from the other.

3. A stereopticon-phonograph disc as claimed in claim 2 wherein the outer surface of said coating is normal to the incident light rays while the inner surface reflects toward the projector and at an angle to the incident rays.

4. In combination with a sound record disc, a series of film transparencies arranged around the disc, a transparent coating superimposed on said films, the outer surface of said transparent coating being substantially plane and at an angle to divert the first surface reflection of incident light along a path divergent from mean reflections from the second surface, said second surface of the transparent coating together with transparency being of concave shape to constitute said second surface as a light condensing element in an image projection system.

5. In combination, a transparent optical element consisting of a plano-convex lens element, having an outer plane surface, a transparent film image cemented to the convex surface of said lens, and a reflective surface deposited thereon, the axis of the convex surface being inclined to the normal of the plane surface, thereby forming a combination reflecting lens and prism.

6. In combination, a transparent optical element consisting of an optical wedge, convex cylindrical lens surface on each surface of said wedge, the axis of said cylinders oriented substantially at 90°, a transparent film image cemented to the convex surface of one of said lens surfaces and a reflective coating deposited thereon.

7. A multi-picture unit for stereopticons, comprising a series of film transparencies arranged around the unit, each transparency having its front surface normal to the incident rays of the stereopticon and its rear surface at a sufficient angle to divert the first surface reflection of incident light along a path divergent from the mean reflection from the back surface of the film, there being only one refraction of the light rays reflected from the film, and wherein the back surface of the film is also at a slight angle to the plane of the unit to compensate for the refraction of the emergent reflected rays from the front surface.

8. A stereopticon-phonograph record having a series of miniature still pictures concentrically arranged around the center of the record, said pictures being transparencies with a reflecting opaque backing, each picture being adapted to be projected successively and having a transparent juxtaposed coating with non-parallel front and back surfaces, said coating for each picture being in the form of an optical wedge having at least one convex surface, the front surface being generally normal to the illuminating rays and the back surface at such an angle that the optical image of the picture is reflected onto the screen while the rays reflected from the front surface do not reach the screen.

9. A stereopticon-phonograph record having a series of miniature still pictures concentrically arranged around the center of the record, said pictures being transparencies with a reflecting opaque backing, each picture being adapted to be projected successively, having a transparent juxtaposed coating with non-parallel front and back surfaces, the front surface being normal to the illuminating rays and the back surface being convex and at such an angle that the specular image of the picture is reflected onto the screen while the rays reflected from said front surface do not reach the screen, and wherein said coating is cemented to the front surface of the film by a transparent material of substantially the same refractive index as said coating.

GEORGE P. BENTLEY.
FRANK R. HOUSE.

References Cited in the file of this patent

UNITED STATES PATENTS

| Number | Name | Date |
|---|---|---|
| 51,906 | Swan | Jan. 2, 1866 |
| 540,768 | Western | June 11, 1895 |
| 578,589 | Vernon | Mar. 9, 1897 |
| 634,146 | Maddox | Oct. 3, 1899 |
| 957,502 | Dupuis | May 10, 1910 |
| 960,519 | Dutton | June 7, 1910 |
| 1,655,365 | Gurtov | Jan. 3, 1928 |
| 1,902,907 | Semenity | Mar. 28, 1933 |
| 1,918,705 | Ives | July 18, 1933 |
| 1,929,173 | Koch | Oct. 3, 1933 |
| 2,314,417 | Neal | Mar. 23, 1943 |
| 2,369,483 | Musebeck | Feb. 13, 1945 |

FOREIGN PATENTS

| Number | Country | Date |
|---|---|---|
| 225,754 | Germany | July 10, 1909 |
| 605,270 | Great Britain | July 20, 1948 |